(No Model.) 3 Sheets—Sheet 1.
R. T. SCOWDEN, Dec'd.
J. P. SCOWDEN, Executrix.
APPARATUS FOR PURIFYING WATER.
No. 559,817. Patented May 12, 1896.
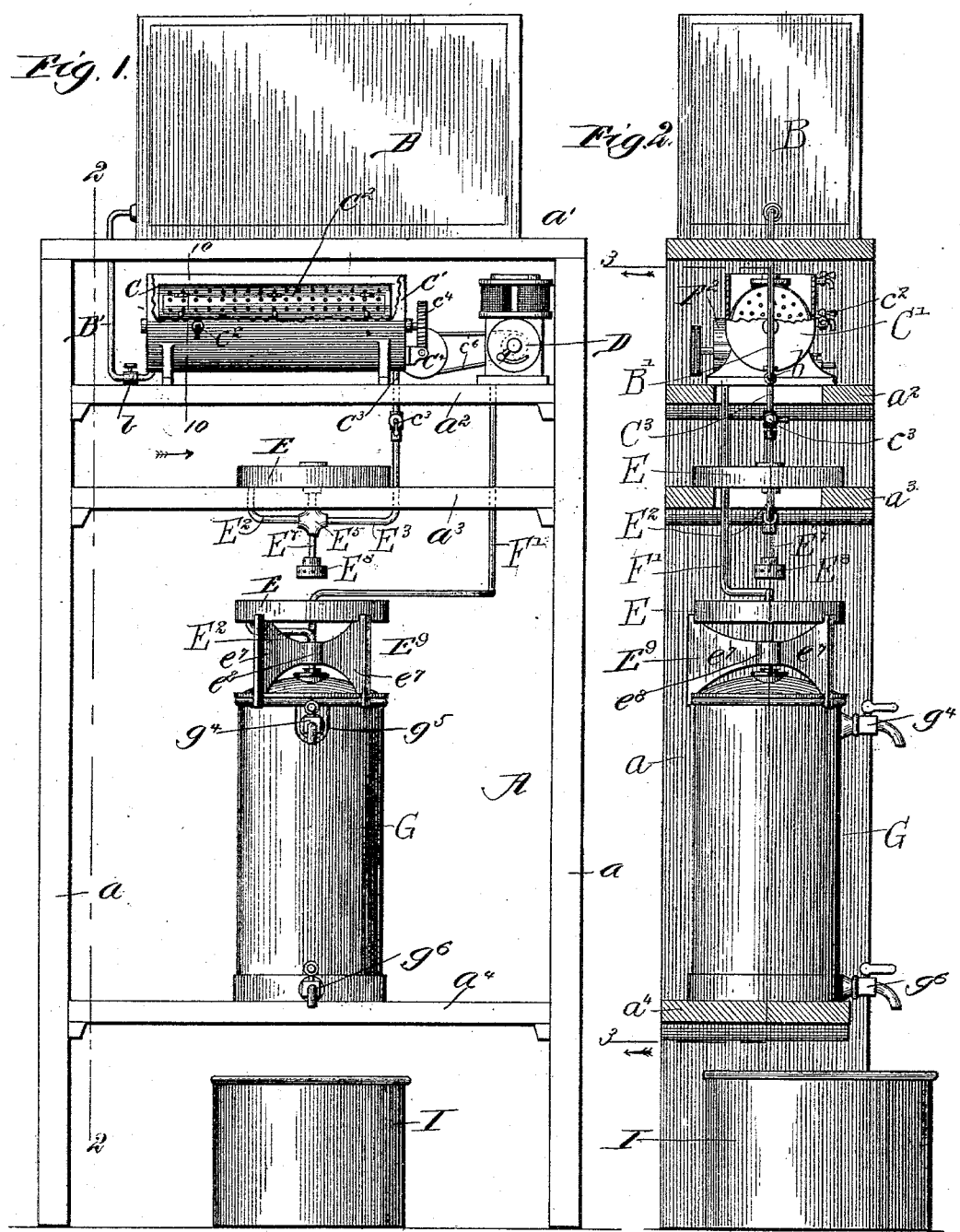
Witnesses
W. C. Coolies
Fredk. H. Thies.
Inventor
Ransom T. Scowden,
By Dayton, Poole & Brown
Attys.

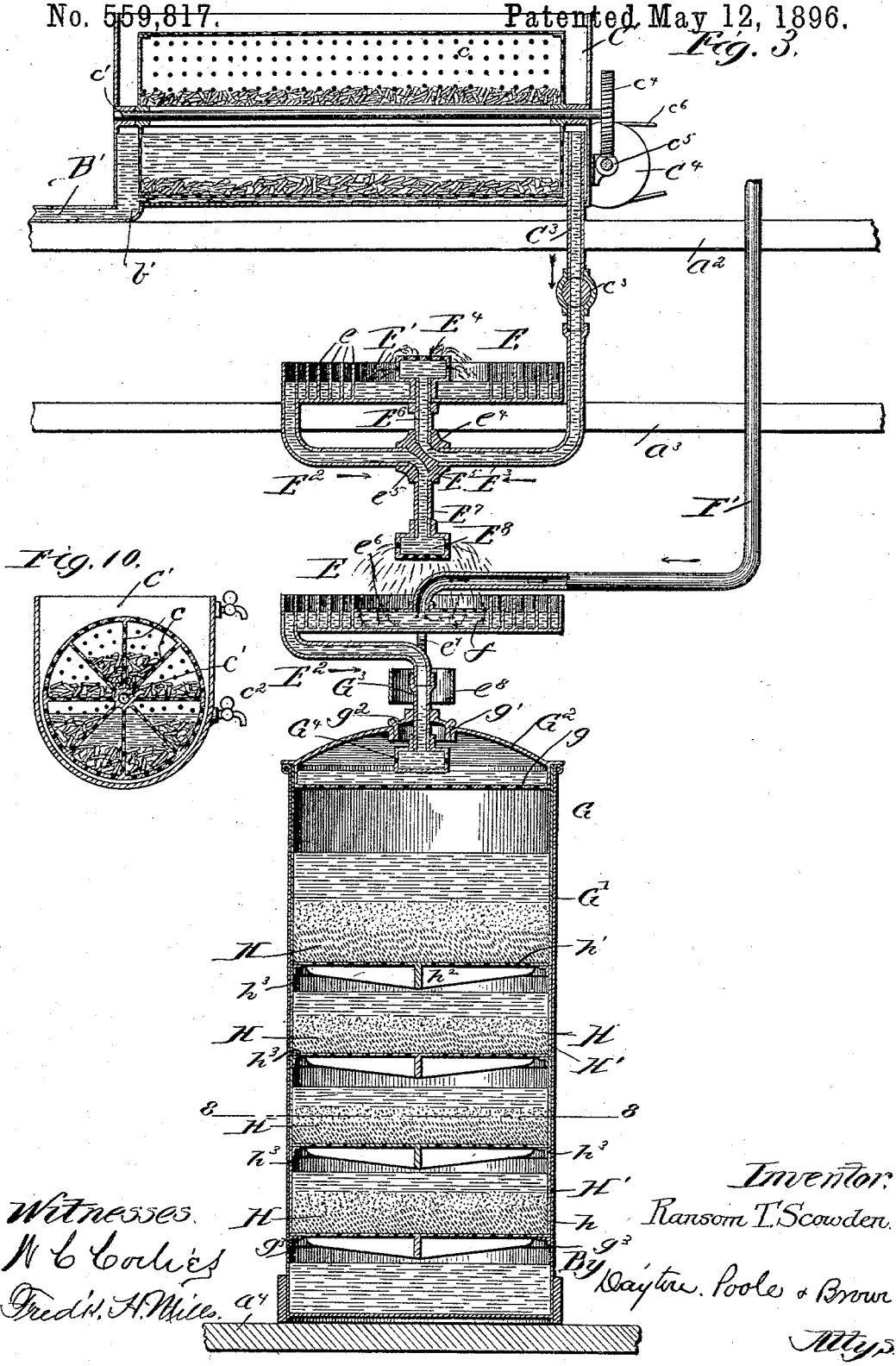

(No Model.)  3 Sheets—Sheet 3.
R. T. SCOWDEN, Dec'd.
J. P. Scowden, Executrix.
APPARATUS FOR PURIFYING WATER.
No. 559,817.  Patented May 12, 1896.
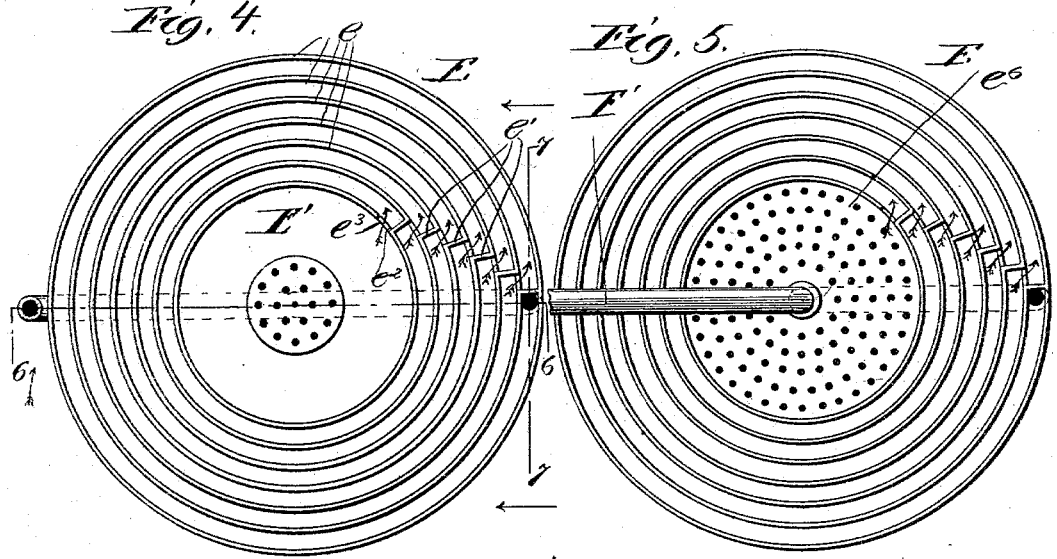
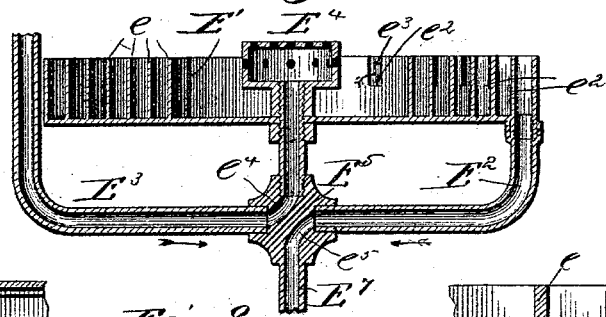
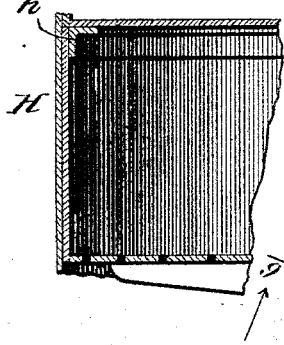
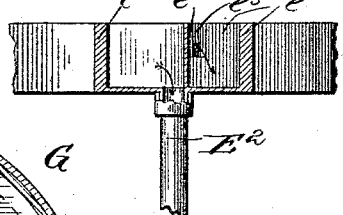
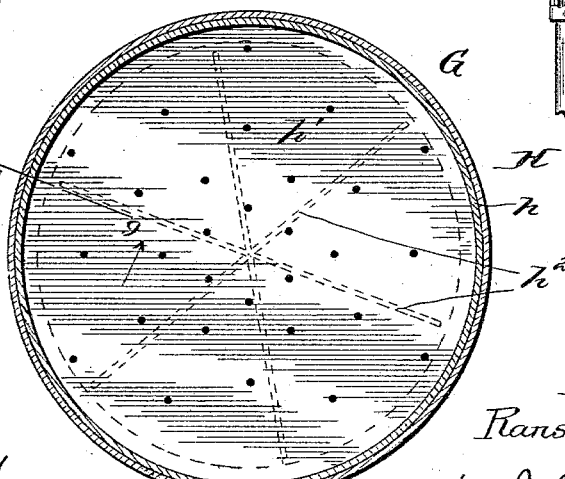
Witnesses:
W. C. Coelies
Fred'k H. Miles.
Inventor
Ransom T. Scowden
By Dayton, Poole & Brown
Attys.

UNITED STATES PATENT OFFICE.

RANSOM T. SCOWDEN, OF CHICAGO, ILLINOIS; JULIA P. SCOWDEN, EXECUTRIX OF SAID RANSOM T. SCOWDEN, DECEASED, ASSIGNOR, BY MESNE ASSIGNMENTS, TO THE REVOLVING PURIFIER COMPANY, OF NEW JERSEY.

APPARATUS FOR PURIFYING WATER.

SPECIFICATION forming part of Letters Patent No. 559,817, dated May 12, 1896.

Application filed November 10, 1891. Renewed October 16, 1895. Serial No. 565,890. (No model.)

*To all whom it may concern:*

Be it known that I, RANSOM T. SCOWDEN, of Chicago, in the county of Cook and State of Illinois, have invented certain new and useful Improvements in Apparatus for Purifying Water; and I do hereby declare that the following is a full, clear, and exact description thereof, reference being had to the accompanying drawings, and to the letters of reference marked thereon, which form a part of this specification.

This invention relates to apparatus for purifying water, and more particularly to that type in which the water is purified by contact with "scrap-iron" by the process known as the "Anderson" process.

The present invention has for its object the production of an apparatus for household use, or for use in restaurants, public or office buildings, and other locations in which a small isolated plant for the purification of the water supply is desirable, which apparatus shall be simple and effective for its purpose, compact, and easily taken apart for inspection or cleaning and replaced thereafter.

To these ends my invention consists in certain novel features which I will now proceed to describe, and then particularly point out in the appended claims.

In the accompanying drawings, Figure 1 is a front elevation of an apparatus embodying my invention in one form. Fig. 2 is a vertical sectional view of the same, taken on the line 2 2 of Fig. 1 and looking in the direction of the arrows. Fig. 3 is an enlarged detail sectional view taken on the line 3 3 of Fig. 2 and looking in the direction of the arrows. Fig. 4 is a detail plan view of the upper settling tank or basin. Fig. 5 is a similar view of the lower settling tank or basin. Fig. 6 is a vertical sectional view taken on the line 6 6 of Fig. 4 and looking in the direction of the arrows. Fig. 7 is a detail sectional view taken on the line 7 7 of Fig. 4 and looking in the direction of the arrows. Fig. 8 is an enlarged plan section, taken on the line 8 8 of Fig. 3, with the filtering material removed. Fig. 9 is a detail sectional view taken on the line 9 9 of Fig. 8 and looking in the direction of the arrows. Fig. 10 is a detail transverse sectional view of the cylinder and trough.

In the said drawings, A represents a suitable framework, consisting in the present instance of uprights $a$ and supporting shelves or platforms $a'$, $a^2$, $a^3$, and $a^4$, it being obvious, however, that the various elements of the apparatus may be supported in any suitable manner. Upon the upper shelf or platform $a'$ is mounted a tank or reservoir B, containing or supplied with the water to be purified. Upon the next shelf $a^2$ is mounted the rotary purifying-cylinder C. This cylinder is constructed, so far as its main features are concerned, in the manner set forth in an application filed by me October 2, 1891, Serial No. 407,544—that is to say, the cylinder is perforated or apertured and is provided with longitudinal apertured partitions $c$, forming longitudinal compartments, each containing a charge of scrap-iron, such as iron borings, turnings, or punchings. The cylinder revolves in an open trough C', provided with suitable bearings for the shaft $c'$, Fig. 3, of the cylinder C, and receiving the water from the supply-tank B at one of its ends by means of a pipe B', provided with a valve or cock $b$, controlling the flow of the water through said pipe, the pipe opening into the bottom of the trough C' at one end thereof, as shown at $b'$ in Fig. 3.

So far the general construction does not differ from that described in my said prior application. It will be observed, however, that the trough C' is carried or extended upward to a line above the highest point of the cylinder C, and is provided at the normal water-line with an overflow-cock $c^2$, for the purpose hereinafter set forth. It will also be noted that the influent pipe B' opens into a space between the head of the trough and the head of the cylinder, so that the water will be carried up and through the cylinder and not around the same, and the space between the trough and cylinder is reduced as much as possible to further this object. To facilitate the removal and introduction of the iron, the cylindric wall of the cylinder is made or provided with hinged sections $C^2$ for each longitudinal compartment, extending the entire length of the same, and provided with suitable fastening devices by means of which they may be secured in a closed position. It will also be noted that the outlet-pipe $C^3$ extends upward through the bottom of the trough to the height of the normal water-level in a space formed between the head of the cylinder and the head of the trough to receive the same. The outlet-pipe is provided with a stop-cock or valve $c^3$, by means of which the said pipe may be closed when desired.

Rotary movement is imparted to the cylinder C by means of a small motor D, (shown in the present instance as an electric motor,) mounted on the shelf $a^2$ and connected with the cylinder by suitable intermediate gearing. The gearing which I prefer for this purpose is that shown, consisting of a worm-wheel $c^4$ on the shaft $c'$ of the cylinder, with which meshes a worm $c^5$, the shaft of which has a pulley $C^4$, driven by a belt $c^6$ from the driving-pulley $d$ of the motor D.

Below the purifying-cylinder C there are located two circulating and settling basins or tanks E. A greater or less number of these basins may be used, as may be found necessary or desirable.

Referring now to the construction shown, the upper basin E rests upon the shelf $a^3$, which is cut away centrally to accommodate those parts of the apparatus which extend downward from the said basin. The basin E is provided with a plurality of concentric vertical partitions $e$, the innermost of which forms a central receiving-space $E'$, and between each adjacent pair of these partitions is located a transverse partition $e'$, each partition being cut away for about one-half its height, as shown at $e^2$, immediately adjacent to said partitions, thus forming an outlet from each of the grooves or open passages $e^3$, formed between the partitions $e$ to the groove or passage next outside, said partitions $e'$ and outlets $e^2$ being arranged in an alternating series, as shown in Figs. 4 and 5. Water is admitted from the cylinder C to the central receiving-space $E'$ of the basin E and filling the same to the proper height will overflow through the first outlet $e^2$ into the innermost passage $e^3$, and thence through the next outlet to the next passage, and so on, the water thus pursuing a spiral course and escaping through a discharge-pipe $E^2$, Fig. 6, opening into the outermost passage $e^3$ immediately in front of the partition $e'$ thereof.

The connection between the purifying-cylinder and the first circulating and settling basin may be effected in any suitable manner, and I have shown as a simple and satisfactory construction for this purpose a pipe $E^3$, having desirably an open connection with the outlet-pipe $C^3$ of the cylinder C, although it may form a continuation of the said outlet-pipe, said pipe E extending under the basin E beneath the center thereof and there connected with a distributer $E^4$, consisting of an apertured box, preferably cylindric in form and located in the receiving-space $E'$ of the basin E above the water-line thereof. As a means for connecting and supporting the several pipes I employ a double coupling $E^5$, having a passage $e^4$, connecting the pipe $E^3$ with a short vertical pipe $E^6$, extending upward to the distributer $E^4$, and a passage $e^5$, connecting the discharge-pipe $E^2$ with a downward extension $E^7$, terminating in a distributer $E^8$, in the form of an apertured cylindric box, screwing on the threaded lower end of the discharge-pipe and located above the receiving-space of the second circulating and settling tank E.

The second basin E is constructed in the same manner as the first, except that the receiving-space $E'$ thereof is provided with a horizontal apertured diaphragm $e^6$, located at about the water-line thereof, and forming of the lower portion of said space an air-box or aerator F, to which air is supplied by a pipe $F'$, leading to a blower $F^2$ on the shaft of the motor D, or supplied with air under pressure from any other suitable source. The pipe $F'$ screws into or is otherwise detachably connected with the diaphragm $e^6$.

G is a filtering-tank on which the second basin E is mounted, being carried by a supporting-frame $E^9$, having three diverging arms $e^7$, united by a central annular body $e^8$, the upper edges of these arms receiving the basin E, while their lower edges rest on the upper edge of the filtering-tank G.

The filtering-tank G is mounted on the shelf $a^4$ and comprises a hollow cylindric body $G'$, closed at its upper end by a removable cover $G^2$. This cover is in the shape of a hollow chamber provided with an apertured bottom $g$ and having in its top an opening $g'$, provided with a suitable closure $g^2$, (shown in the present instance as a screw-plug.) A pipe $G^3$ extends through this closure and has at its upper end an open connection with the discharge-pipe $E^2$ of the second basin E, while its lower end is provided with a distributer $G^4$ in the shape of an apertured cylindrical box screwing onto the lower end of said pipe. The pipe $G^3$ may form a continuation of or be tightly coupled to the pipe $E^2$. The distributer $G^4$ is of a diameter small enough to permit it to readily pass through the opening $g'$ in the cover $G^2$, thus permitting its insertion and withdrawal.

The filtering-tank G contains within its body portion $G'$ a plurality of superposed filter-beds H, separated by intervening air-spaces. Each filter-bed H is contained in a receptacle $H'$, each receptacle being composed of an annular body $h$, adapted to fit within the body $G'$ of the tank, and provided with an apertured bottom $h'$, having on its under side radial strengthening-ribs $h^2$. The tank-body $G'$ is provided at a suitable distance above its bottom with an internal flange $g^3$, upon which the lowermost of the receptacles $H'$ rests, and each of the receptacles $H'$ except the uppermost is provided at the upper margin of its annular body $h$ with an annular flange $h^3$, upon which the receptacle immediately above it rests. The cover $G^2$ fits into the uppermost receptacle H'. The filtering-beds are of any suitable material—as, for instance, gravel and sand in layers in the usual proportions—and as each bed fills its receptacle for only a portion of its height an air-space is thus formed above each bed.

The tank G is provided with an overflow-cock $g^4$, attached to the uppermost receptacle H' and projecting through a notch $g^5$, cut in the body G' of the tank from its upper margin downward to accommodate said cock and permit the removal of the receptacle to which it is attached. A discharge-cock $g^6$ at the lower portion of the body G' of the tank serves to permit the withdrawal of the purified and filtered water from the bottom of the tank, at which point it may be discharged into a suitable receiving vessel or tank I.

The operation of the apparatus is as follows: The water to be purified flows from the tank B through the pipe B' to the trough C', the valve or cock $b$ being opened for this purpose. Passing through the revolving cylinder C the water is subjected to the purifying action of the scrap-iron contained therein. The overflow-cock $c^2$ and stop-cock $c^3$ being both open the water in the trough is kept at the normal level shown in Fig. 3, the overflow-cock insuring the maintaining of this level in case the outlet-pipe fails for any reason to accomplish this. The cylinder C is thus caused, while in operation, to revolve partly in the air and partly in the water in the manner and for the purpose set forth in my prior application hereinbefore specified. After being subjected to thorough contact with the cylinder and its contents the water passes through the outlet-pipe $C^3$ and pipes $E^5$ $E^6$ to the distributer $E^4$, from which it is discharged in jets through the atmosphere into the receiving-space E' of the upper circulating and settling basin E, being thus thoroughly aerated at its point of discharge. From the central receiving-space the water passes in a spiral course through the passages $e^3$, being during this course exposed to the air, and passing over a considerable distance in a compact space. Oxidation and consequent precipitation of the sediment thus formed occur at this point, the whole or a portion of the impurities contained in the water being thus deposited in the first settling-basin. It will be observed in this connection that the outlets $e^2$ connecting the adjacent pairs of passages $e^3$ are only cut down a portion of the depth of the partitions $e$, so that about one-half of the said partitions are left standing at these points. By reason of this construction each of the circular passages $e^3$ forms a separate settling-trough, retaining its own sediment, which is prevented from passing into the succeeding passages along with the water by the portions of the partitions left standing. The water passes from the first basin to the second basin by means of the pipes $E^2$ $E^7$, and is discharged in jets from the distributer $E^8$ through the atmosphere, falling into the central receiving-space E' of the second circulating and settling tank E. While in this central space the water is further aerated by means of the air supplied to the air-box F by the pipe F' from the blower $F^2$, which air passes up through the apertured diaphragm $e^6$ and through the water, thus giving it an aeration additional to that received in its descent from the distributer $E^8$. The water passes through the second circulating and settling basin in the manner described in connection with the first basin, and, after depositing what further sediment it may carry, passes down through the pipes $E^2$ $G^3$ into the chamber within the cover $G^2$ of the filtering-tank G, into which it is discharged from the distributer $G^4$. Passing through the perforated bottom of the cover $G^2$, which, in conjunction with the distributer $G^4$, serves to distribute it evenly, the water falls through an air-space upon the first filter-bed H, and, passing through the apertured bottom $h'$ of the receptacle H' containing the same, falls through another air-space upon the second filtering-bed, and so on through successive air-spaces and filtering-beds, the purified and filtered water collecting in the bottom of the tank-body G' and being withdrawn by the cock $g^6$ into the vessel I or any other convenient receptacle.

It is obvious that in some cases a single circulating and settling basin will be sufficient, while in other cases a greater number than the two shown may be required by the circumstances of the case. It is also obvious that any one or more or all of the basins may be provided with an air-box and supply connections such as shown applied to the second basin in the construction shown. The number of filter-beds in the filtering-tank may also be varied to suit the requirements of each case.

I do not wish to limit myself to the particular mode of connecting the several parts of the apparatus shown and described, although I prefer some such construction for the reason that all of the parts may be readily detached and removed for cleaning and as readily replaced thereafter. This is particularly true of the basins, because of the rapid deposit of sediment therein. The same facility of removal and replacement attends the construction of the filtering-tank shown and described, the several receptacles containing the filter-beds being readily removable for cleaning, although this operation is not required with great frequency, owing to the ample provision made for the deposit of the sediment before the water enters the filtering-tank.

When the apparatus is not in use, those portions of the cylinder and its contents which are above the normal water-level of the containing-trough are liable to rapid oxidation if exposed to the air, a condition detrimental to the successful operation of the apparatus. For this reason, when the apparatus is not in use, the overflow-cock $c^2$ and stop-cock $c^3$ are closed, and the trough C' filled with water to a height sufficient to cover the cylinder and its contents, thereby preventing access of the air to them and protecting them from undue oxidation. By opening the overflow-cock the normal water-level may be restored.

What I claim is—

1. In an apparatus for purifying water, the combination, with a revolving purifying-cylinder containing scrap-iron through which the water passes, of a circulating and settling basin having a tortuous or indirect passage open at its top, and a receiving-space, and a distributer located above said receiving-space and connected with the outlet of the cylinder, substantially as described.

2. In an apparatus for purifying water, the combination with means for treating water with a purifying medium, of a circulating and settling basin provided with a plurality of concentric passages, open to the air and each provided with a transverse terminal partition, said partitions being out of line with one another and a passage between each adjacent pair of passages intermediate between the transverse partitions thereof, substantially as described.

3. In an apparatus for purifying water the combination with the purifying-cylinder through which the water passes of a circulating and settling basin having a central receiving-space and concentric communicating-passages, and a distributer located over the receiving-space above the water-line thereof and connected with the discharge of the cylinder, substantially as described.

4. The circulating and settling basin having concentric communicating-passages and a central receiving-space provided with an apertured air-box suitably connected with a source of air under pressure, substantially as described.

5. In an apparatus for purifying water, the combination with means for treating water with a purifying medium, of a circulating and settling basin having concentric communicating-passages and a central receiving-space provided with an apertured air-box connected with a source of air under pressure, in combination with a distributer located centrally above the receiving-space and connected with the discharge of the cylinder, substantially as described.

6. In an apparatus for purifying water, the combination, with a revolving purifying-cylinder containing scrap-iron, of one or more circulating and settling basins, means for aerating the water at its point of discharge into said basins, and a filter-tank containing a plurality of superposed filtering-beds with intervening air-spaces, substantially as described.

7. In an apparatus for purifying water, the combination, with an apertured revolving cylinder containing scrap-iron, of an open trough snugly inclosing the lower portion of said cylinder at its sides and bottom, and extending beyond said cylinder at its ends to form spaces for the inlet and outlet pipes, substantially as described.

8. In an apparatus for purifying water, the combination, with an apertured revolving cylinder containing scrap-iron, of an open trough inclosing the lower portion of said cylinder and extending above the top of the same, said trough being provided with an outlet-pipe having an opening at a height about midway of the cylinder, and means for closing said outlet-pipe, substantially as described.

In testimony that I claim the foregoing as my invention I affix my signature in presence of two witnesses.

RANSOM T. SCOWDEN.

Witnesses:
M. E. DAYTON,
IRVINE MILLER.